United States Patent
Lee et al.

(10) Patent No.: US 9,558,050 B2
(45) Date of Patent: Jan. 31, 2017

(54) GENERAL MIDDLEWARE BRIDGE AND METHOD THEREOF

(75) Inventors: Hark-Jin Lee, Gumi-si (KR); Ji-Yeon Son, Daejeon (KR); Young-Sung Son, Daejeon (KR); Kyeong-Deok Moon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 880 days.

(21) Appl. No.: 12/882,459

(22) Filed: Sep. 15, 2010

(65) Prior Publication Data

US 2011/0066757 A1    Mar. 17, 2011

(30) Foreign Application Priority Data

Sep. 15, 2009  (KR) .................. 10-2009-0087081
Mar. 29, 2010  (KR) .................. 10-2010-0027999

(51) Int. Cl.
| G06F 15/16 | (2006.01) |
| G06F 9/54 | (2006.01) |
| G06F 15/173 | (2006.01) |
| G06F 17/00 | (2006.01) |

(52) U.S. Cl.
CPC .............. *G06F 9/546* (2013.01); *G06F 9/541* (2013.01)

(58) Field of Classification Search
CPC .. H04L 67/02; G06F 17/2247; G06F 17/2725; G06F 17/3089; G06Q 10/10
USPC .................. 709/203, 223, 230, 246; 715/249
See application file for complete search history.

(56) References Cited

U.S. PATENT DOCUMENTS

| 5,737,497 A * | 4/1998 | Ballard ............... G06F 17/5045 706/47 |
| 7,149,808 B2 * | 12/2006 | Lu ........................... H04L 29/06 370/395.5 |
| 7,542,982 B2 * | 6/2009 | Kalia .................. G06F 17/2247 |
| 7,644,357 B2 * | 1/2010 | Aoyama ................. H03M 5/00 715/249 |
| 2003/0110073 A1 * | 6/2003 | Briel ..................... G06Q 30/06 705/27.1 |
| 2003/0154298 A1 * | 8/2003 | Lu ........................... H04L 29/06 709/230 |
| 2005/0005116 A1 * | 1/2005 | Kasi ...................... G06Q 10/10 713/170 |

(Continued)

FOREIGN PATENT DOCUMENTS

| KR | 10-0636380 | 10/2006 |
| KR | 10-0706318 | 4/2007 |

*Primary Examiner* — Edward Kim
*Assistant Examiner* — Vitali Korobov
(74) *Attorney, Agent, or Firm* — Staas & Halsey LLP

(57) ABSTRACT

There are disclosed a general middleware bridge supporting an interoperability operation between devices on different middlewares and a method thereof. The general middleware bridge according to the present invention includes: a conversion rule collector collecting message conversion rules for an interoperability operation between different middleware devices; a conversion rule register registering the message conversion rules for each message type; and a message converter interconverting messages from the middleware devices on the basis of the message conversion rules and transferring the converted messages for each message type.

8 Claims, 12 Drawing Sheets

(56) References Cited

U.S. PATENT DOCUMENTS

| | | | |
|---|---|---|---|
| 2005/0044197 A1* | 2/2005 | Lai | G06Q 10/10 |
| | | | 709/223 |
| 2008/0140433 A1* | 6/2008 | Levy | G06F 21/10 |
| | | | 705/26.1 |
| 2010/0010954 A1* | 1/2010 | Lee | G06F 17/3089 |
| | | | 706/47 |
| 2010/0057680 A1* | 3/2010 | Little | G06F 17/3089 |
| | | | 707/E17.014 |
| 2010/0057835 A1* | 3/2010 | Little | H04L 67/16 |
| | | | 709/203 |
| 2010/0094928 A1* | 4/2010 | Nakamura | H04L 67/125 |
| | | | 709/203 |

* cited by examiner

FIG.5

```
<LocalMessageProPertys>
<Property>
<name>DeviceID</name>
<content>0xFE033800C5
</content>
</Property>
</LocalMessageProPertys>
```
— 209

GENERAL MIDDLEWARE BRIDGE AND METHOD THEREOF

CROSS REFERENCE TO RELATED APPLICATIONS

This application claims priority to Korean Patent Application No. 10-2009-0087081 filed on Sep. 15, 2009 and Korean Patent Application No. 10-2010-0027999 filed on Mar. 29, 2010, the entire contents of which are herein incorporated by reference.

BACKGROUND OF THE INVENTION

1. Field of the Invention

The present invention relates to a general middleware bridge supporting an interoperability operation between devices on different middlewares and a method thereof.

2. Description of the Related Art

In recent years, various methods for supporting different middleware devices have appeared. As a result, an interoperability operation between devices on different middlewares becomes available. However, since such a method places emphasis on a purpose to enable an interoperability operation between the devices connected to different middlewares, whenever a new middleware appears, a new adaptor corresponding to the new middleware should be difficultly developed every time. Therefore, the need for a rapid and convenient method in development of the adaptor is growing.

Presently, as a home network middleware, home audio video interoperability (HAVI), Jini, LonWorks, a home network control protocol (HnCP), universal plug and play (UPnP), etc. are widely being used. Existing bridge methods for the home network middleware adopt a method for separately developing each adaptor for a universal home server by different methods.

However, the existing middleware bridge methods create and support required adaptors, respectively and a method for converting a message for the interoperability operation between the devices should be differently developed for each adaptor. Further, a middleware adaptor developer should have understood a general middleware when the new middleware appears and a lot of knowledge and efforts are also required for the message converting method to the middleware adaptor developer. For example, the middleware adaptor developer should know all essential functions of the adaptor in implementing the adaptor such as an adaptor ID system, a definition method of a protocol for a multicast, etc. Further, as another example, the middleware adaptor developer should know a definition method of a standard protocol and should, in detail, perform analysis and substitution processes in order to convert the standard protocol. It is difficult for the middleware adaptor developer to determine the development time and the standard protocol.

SUMMARY OF THE INVENTION

The present invention provides a general middleware bridge modularizing a common function in order to reduce a burden of developing an adaptor that interoperates between devices on different middlewares and a method thereof.

The present invention also provides a conversion rule schema in order to easily create a conversion rule for modularizing the common function.

The present invention also provides a general middleware bridge supporting an interoperability operation to allow all devices accessing the different middlewares to virtually look like actual physical devices accessing the same middleware and a method thereof.

According to an aspect of the present invention, there is a provided a general middleware bridge that includes: a conversion rule collector collecting message conversion rules for an interoperability operation between different middleware devices; a conversion rule register registering the message conversion rules for each message type; and a message converter interconverting messages from the middleware devices on the basis of the message conversion rules and transferring the converted messages for each message type.

Herein, the message type may include a standard message transferred through a standard protocol channel and a local message transferred to each of the middleware devices.

Further, the message converter may include: a standard message—local message converter converting the standard message into the local message; and a local message—standard message converter converting the local message into the standard message.

In addition, the conversion rule register may update only a conversion rule corresponding to the standard message when update is generated in the standard protocol channel.

Moreover, the conversion rule collector may verify the validity of a newly inputted message conversion rule.

Herein, the conversion rule register may register the corresponding message conversion rule when the inputted message conversion rule is a normal conversion rule from the validity verification result.

Besides, the conversion rule collector may provide an XML-format conversion rule schema for collecting the message conversion rules.

Further, the general middleware bridge may further include a restoration information collector collecting restoration information for restoring messages in order to prevent data from being lost in message conversion of the message converter.

Meanwhile, according to another aspect of the present invention, there is provided a general middleware bridge method that includes: collecting message conversion rules for an interoperability operation between different middleware devices; registering the message conversion rules for each message type; and interconverting messages from the middleware devices on the basis of the message conversion rules and transferring the converted messages for each message type.

According to an embodiment of the present invention, an interoperability operation between different devices is available by a simple method by modularizing a common function in order to a burden of development of an adaptor that interoperates between devices on different middlewares.

According to the embodiment of the present invention, convenience is provided in order for a middleware developer to easily create a conversion rule by providing a conversion rule schema so as to easily create the conversion rule for modularizing the common function.

By this configuration, a conversion rule for exchanging messages such as connection/disconnection, control, event registration/generation notification, etc., between the devices on the different middlewares is described without modifying the corresponding middlewares so as to perform an operation in accordance with the existing corresponding middleware mechanism.

BRIEF DESCRIPTION OF THE DRAWINGS

FIG. 5 is a diagram illustrating information for restoration;

DETAILED DESCRIPTION OF THE PREFERRED EMBODIMENTS

The above-mentioned objects, characteristics, and advantages of the present invention will be more apparent with reference to the accompanying drawings and detailed description described below. Therefore, the spirit of the present invention will be easily implemented by those skilled in the art. In describing the present invention, well-known functions or constructions will not be described in detail since they may unnecessarily obscure the understanding of the present invention. Hereinafter, preferred embodiments of the present invention will be described in detail with reference to the accompanying drawings.

Figure 1:
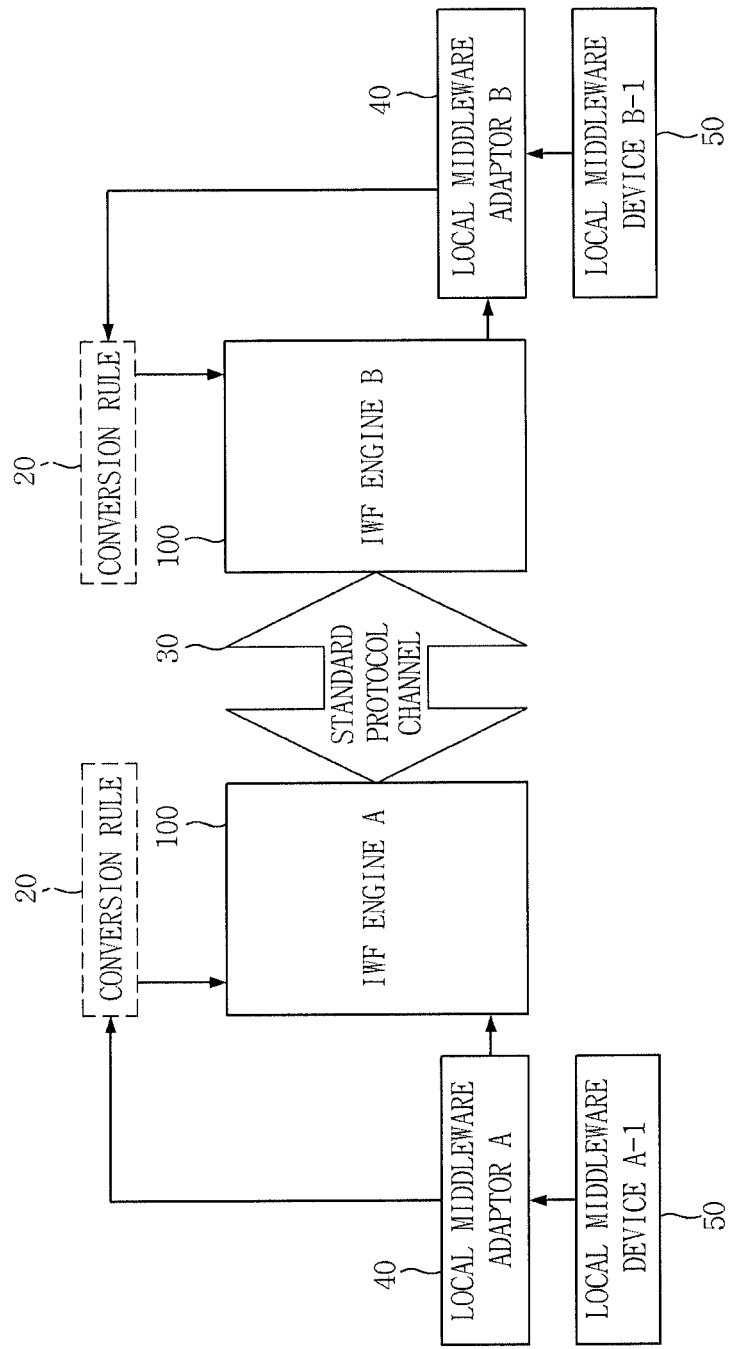
FIG. 1 is a diagram showing a system adopting a general middleware bridge according to the present invention.

FIG. 1 is a diagram showing a system adopting a general middleware bridge according to the present invention.

Referring to FIG. 1, the system adopting the general middleware bridge according to the present invention includes local middleware devices 50, local middleware adaptors 40, and IWF engines 100. In the present invention, for ease of description, each of two local middleware devices 50, local middleware adaptors 40, and IWF engines 100 are illustrated.

In the present invention, the system is configured to support an interoperability operation between the devices 50 on different middlewares. The local middleware devices 50 are positioned on different local middlewares. As described above, a local middleware device A-1 and a local middleware device B-1 are included in the local middleware devices 50.

Herein, the local middleware includes, as a home network middleware, home audio video interoperability (HAVI), JINI, LonWorks, a home network control protocol (HnCP), universal plug and play (UPnP), etc., but it is not limited thereto.

The local middleware adaptors 40 are connected to the corresponding local middleware devices on different middlewares, respectively. That is, the local middleware device A-1 is connected to a local middleware adaptor A and the local middleware device B-1 is connected to a local middleware adaptor B. Herein, the local middleware adaptors A and B are included in the local middleware adaptors.

The IWF (Interworking Function) engines 100 are configured to support the interoperability operations between the local middleware devices 50. In the present invention, an IWF engine A is connected to the local middleware adaptor A and an IWF engine B is connected to the local middleware adaptor B. Herein, the IWF engines A and B are included in the IWF engines.

Herein, the IWF engine 100 includes a common function of the local middleware adaptors 40. That is, the IWF engine 100 collects message conversion rules for the interoperability operation between different middleware devices and registers the message conversion rules for each message type. In addition, the IWF engine interconverts messages from the local middleware devices on the basis of the message conversion rules and transfers the converted messages for each message type. By this configuration, all the devices accessing different middlewares virtually looks like actual physical devices accessing the same middleware.

Further, the IWF engine 100 provides an XML conversion rule schema for receiving the conversion rule in an XML type. Therefore, the middleware adaptor developer can create and input the conversion rule in the XML type.

In addition, in the present invention, the IWF engine 100 helps the middleware adaptor developer create the conversion rule of the XML type through a validity checking function. For example, the IWF engine 100 supports a function to verify the adaptor in developing the adaptor to allow the middleware adaptor developer to test an adaptor function without using another middleware adaptor.

Further, since the IWF engine 100 is independently operated in the system, even though a standard protocol for the interoperability operation is updated, the interoperability operation is available by updating only the IWF engine without middleware adaptor developer's engagement.

In addition, the IWF engine 100 is configured to operate connection/disconnection of the devices, device control, and event registration/generation notification in accordance with the corresponding middleware mechanism without modifying the corresponding middlewares. For example, it is assumed that the local middleware devices 50 are provided on a home network. At this time, each of the local middleware adaptors 40 discovers and controls the connected local middleware device 50.

Meanwhile, the local middleware adaptors 40 provide all the conversion rules 20 corresponding to the local middleware of the local middleware devices 50 to the IWF engines 100 during initialization. The local middleware adaptors 40 notify all the messages (i.e., discover/release of the device, control/monitoring of the device, and event registration/generation) from the local middleware devices 50 to the IWF engine 100. The IWF engine 100 modifies all the received messages in accordance with the conversion rule registered in the local middleware adaptors 40 and transfers the modified messages to a standard protocol channel 30.

For example, the local middleware adaptor A accessed by the local middleware device A-1 provided on the home network discovers and controls the local middleware device A-1. The local middleware adaptor A registers in the IWF engine A all the conversion rules 20 corresponding to a local middleware (i.e., HAVI) of the local middleware device A-1 during the initialization. In addition, the local middleware adaptor B accessed by the local middleware device B-1 provided on the home network discovers and controls the local middleware device B-1. The local middleware adaptor B registers in the IWF engine B all the conversion rules 20 corresponding to a local middleware (i.e., UPnP) of the local middleware device B-1 during the initialization. In addition, all the messages generated between the local middleware devices A-1 and B-1 are changed into standard messages in accordance with the conversion rules registered in the corresponding IWF engines A and B. The changed standard messages are intertransferred through the standard protocol channel 30. Of course, the IWF engines A and B convert and provide the standard messages inputted through the standard protocol channel 30 into a local message for the corresponding middleware device by using the conversion rule.

Figure 2:
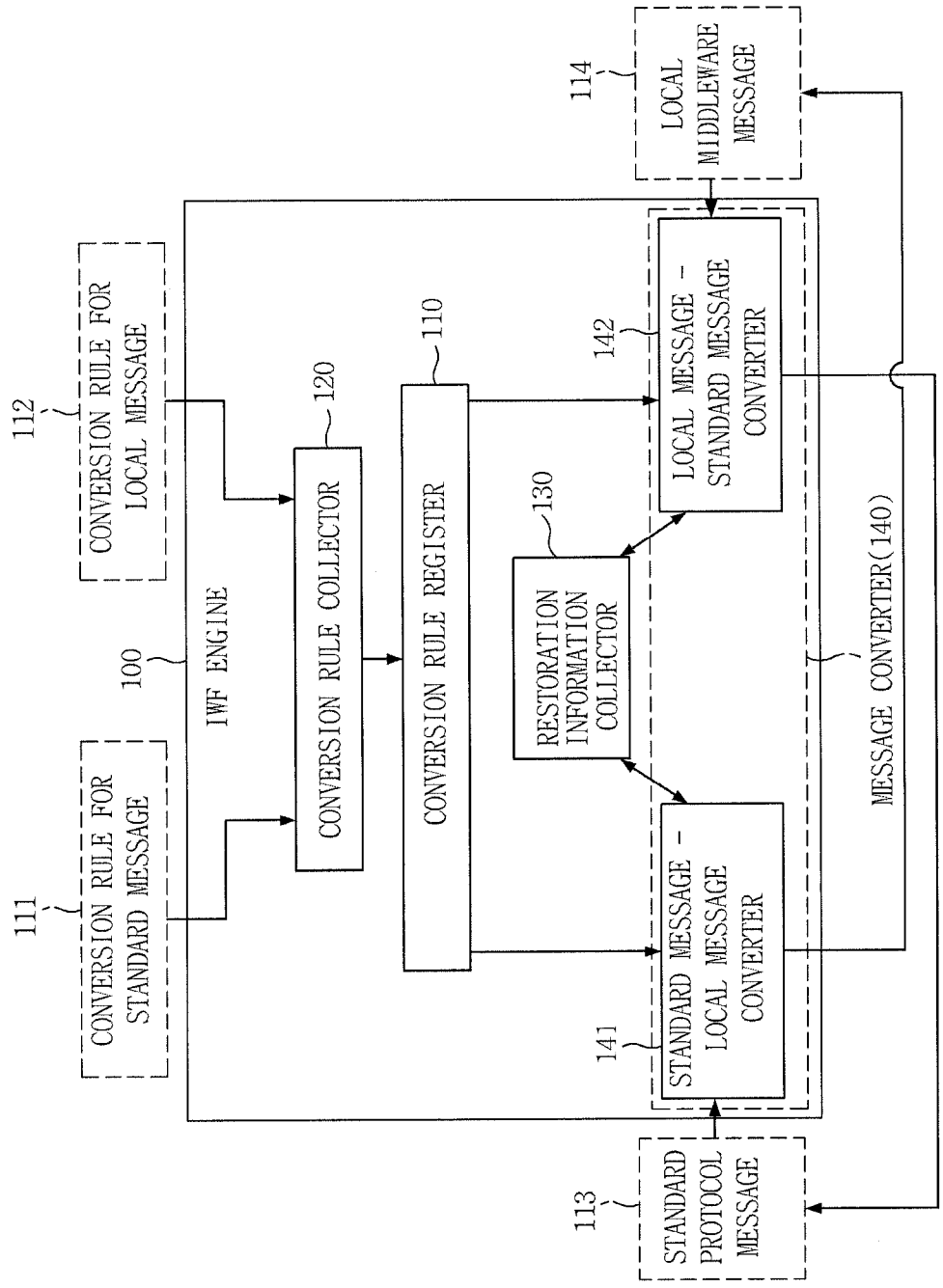
FIG. 2 is a diagram shown for describing internal components of an IWF engine of FIG. 1.
Figure 3:
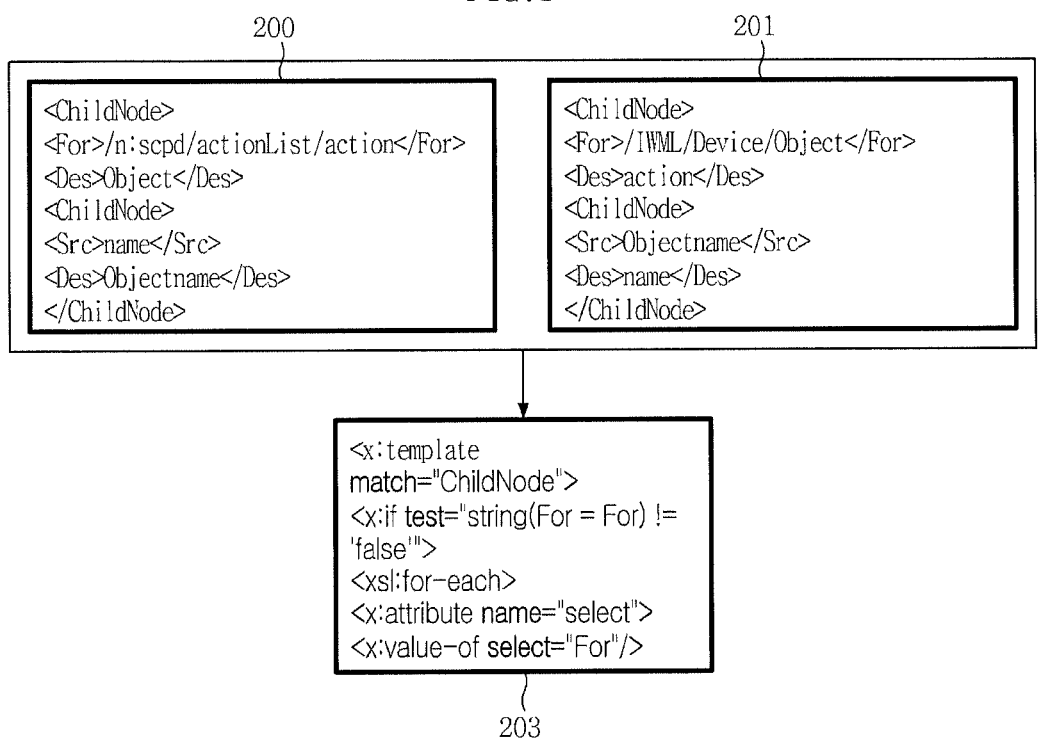
FIG. 3 is a diagram illustrating a message conversion rule.
Figure 4:
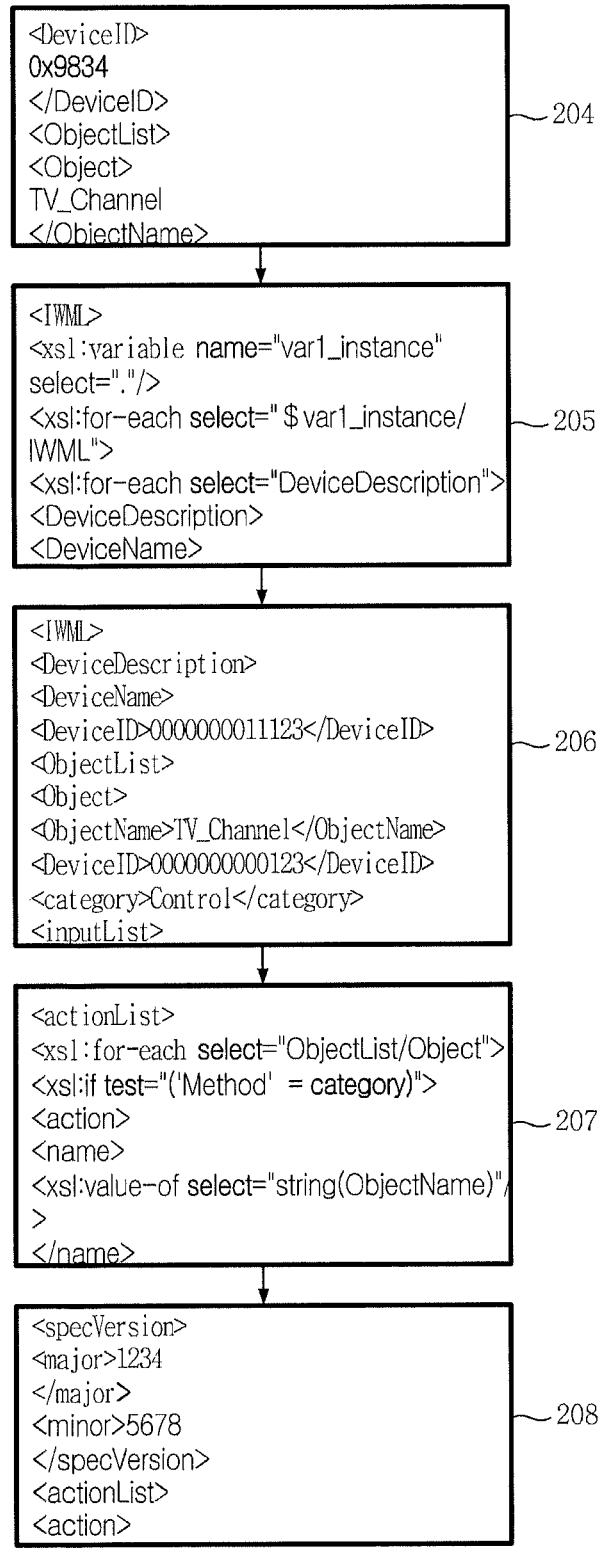
FIG. 4 is a diagram illustrating a conversion process between a standard message and a local message.
Figure 6:
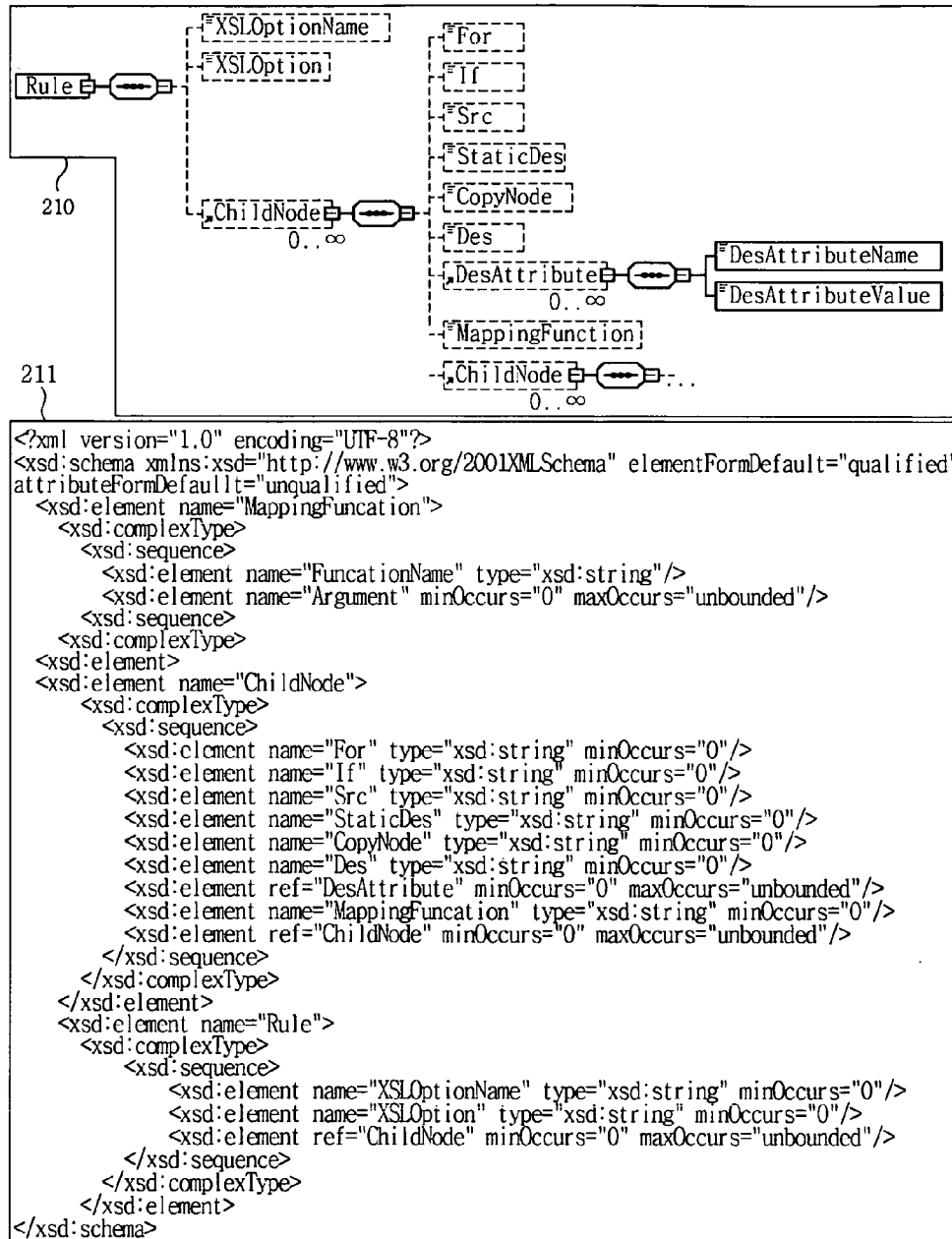
FIG. 6 is a diagram illustrating a conversion rule schema of an XML format.

FIG. 2 is a diagram shown for describing internal components of an IWF engine of FIG. 1, FIG. 3 is a diagram illustrating a message conversion rule, FIG. 4 is a diagram illustrating a conversion process between a standard message and a local message, FIG. 5 is a diagram illustrating information for restoration, and FIG. 6 is a diagram illustrating a conversion rule schema of an XML-format.

Referring to FIG. 2, the IWF engine 100 includes a conversion rule collector 120, a conversion rule register 110, a message converter 140, and a restoration information collector 130. In the present invention, the general middleware bridge may be configured to include the IWF engine or the local middleware adaptor, but preferably includes the IWF engine as a basic configuration.

First, the conversion rule collector 120 collects the message conversion rules for the interoperability operation between different local middleware devices 50. Herein, the message conversion rule includes a conversion rule 111 for the standard message and a conversion rule 112 for the local message. The conversion rule for the standard message is a rule for converting the standard message transferred through the standard protocol channel 30 into the local message (see reference numeral 200 shown in FIG. 3 as one example of the conversion rule for the standard message and is referenced). Further, the conversion rule for the local message is a rule for converting the local message transferred through the local middleware device into the standard message (see reference numeral 201 shown in FIG. 3).

Herein, the conversion rule collector 120 may provide a conversion rule schema of the XML format for collecting the message conversion rules. For example, the conversion rule collector 120 provides the XML-format conversion rule schema illustrated in reference numerals 210 and 211 shown in FIG. 6 and thus collects rules created in the XML type from the middleware adaptor developer (see reference numerals 200 and 201). In addition, the conversion rule collector 120 automatically collects the message conversion rules in an XSLT type through an XSLT document for conversion of the XML format (see reference numeral 203). Herein, extensible style sheet language transformations (XSLT) is a language generally used when modifying an XML expression style, and description thereof is already known and detailed description will be omitted.

Further, the conversion rule collector 120 may verify the validity of a newly inputted message conversion rule. For example, the conversion rule collector 120 verifies the validity of the message conversion rule created by the middleware adaptor developer, that is, the XML format. The validity verification as a basic function of the XML format will not be described.

Herein, from the verification result of the validity of the collected message conversion rule, when the collected message is a normal message conversion rule, the conversion rule collector 120 provides the corresponding message conversion rule to the conversion rule register 110. For example, when the collected message conversion rule is an abnormal conversion rule from the validity verification result, the conversion rule collector 120 requests the corresponding conversion rule again.

The conversion rule register 110 registers the message conversion rules for each message type. For example, the conversion rule register 110 uses and generates the XSLT document for converting the conversion rule 111 for the registered standard message and the conversion rule 112 for the local message into a conversion rule XSLT document. In addition, the generated conversion rule XSLT document is registered in each of a standard message—local message converter 141 and a local message—standard message converter 142. Herein, the extensible style sheet language transformations (XSLT) is an XML-based language used to convert the XML document into another XML document. The XML document is converted into another XML document by using an XML conversion language as a standard established by W3C and XPath is used for searching. An original document is not changed and a new document is created based on the original document. The new document is outputted in a standard XML grammar, HTML, or a general text format. The XSLT is frequently used to convert XML data into the HTML or an XHTML document in order to display the XML data by a webpage. The XSLT is generally used to convert XML messages using different XML schemas or change a document in one schema (e.g., delete unnecessary parts in the message). Since more detailed description of the XSLT is already known, description of the XSLT will be omitted.

Further, the conversion rule register 110 may update only the message conversion rule corresponding to the standard message when update is generated in the standard protocol channel 30. That is, the conversion rule register 110 searches and changes only the message conversion rule corresponding to the updated part of the standard protocol channel 30 in the message converter 140.

Further, when the collected conversion rule is the normal conversion rule from the validity verification result in the conversion rule collector 120, the conversion rule register 110 registers the corresponding message conversion rule.

The message converter 140 interconverts the messages from the middleware devices into each other on the basis of the message conversion rules and transfers the converted messages for each message type.

Herein, the message type includes a standard message transferred through the standard protocol channel 30 and a local message transferred to each middleware device.

Further, the message converter 140 includes the standard message—local message converter 141 converting the standard message into the local message and the local message—standard message converter 142 converting the local message into the standard message.

The standard message—local message converter 141 converts the standard message (see reference numeral 206 of FIG. 4) inputted through the standard protocol channel 30 into the local message (see reference numeral 208 of FIG. 4) by using the registered conversion rule (see reference numeral 207 of FIG. 4), i.e., a conversion rule XSLT document for converting the standard message into the local message and transfers the converted message.

The local message—standard message converter 142 converts the local message (see reference numeral 204 of FIG. 4) inputted from the local middleware adaptor 40 into the standard message (see reference numeral 206 of FIG. 4) by using the registered conversion rule (see reference numeral 205 of FIG. 4), i.e., a conversion rule XSLT document for converting the local message into the standard message and transfers the converted message.

For example, referring to FIG. 4, a process of transferring the messages between the IWF engines A and B shown in FIG. 1 will be described. The local message (see reference numeral 204 of FIG. 4) received into the IWF engine A is converted into the standard message (see reference numeral 206 of FIG. 4) by the local message—standard message XSLT document 205. In addition, the standard message is converted into the local message (see reference numeral 207 of FIG. 4) of another type by the standard message—local message XSLT document (see reference numeral 208 of FIG. 4) in the IWF engine B and thereafter, it is inputted into the local middleware. As such, various types of the local messages are transferred to each other through conversion with the standard message.

The restoration information collector 130 collects restoration information for restoring the message in order to prevent data from being lost when the message converter 140 converts the message (see reference numeral 209 of FIG. 5). In general, in protocol conversion, that is, converting the original message into the converted message, the messages have different schemas and data expression types. Therefore, since data for the converted message in the message conversion cannot include all data of the original message, the loss cannot help being generated.

Herein, the restoration information collector 130 stores information (i.e., reference to information to be restored and information required to restore the message when the local middleware registers the conversion rule) on restoration. For example, when the local middleware device 50 sends information relating to the multicast expressed as the information on restoration, the information is stored in a memory (not shown). Further, an ID managed by the conversion rule collector 120 is connected with an ID used by the local middleware device 50 and the connected IDs are stored in the memory. In addition, when the local message is converted into the standard message, the restoration information collector 130 stores the corresponding restoration information. Restoration is performed by calling the information when the standard message is converted into the local message.

Figure 7:
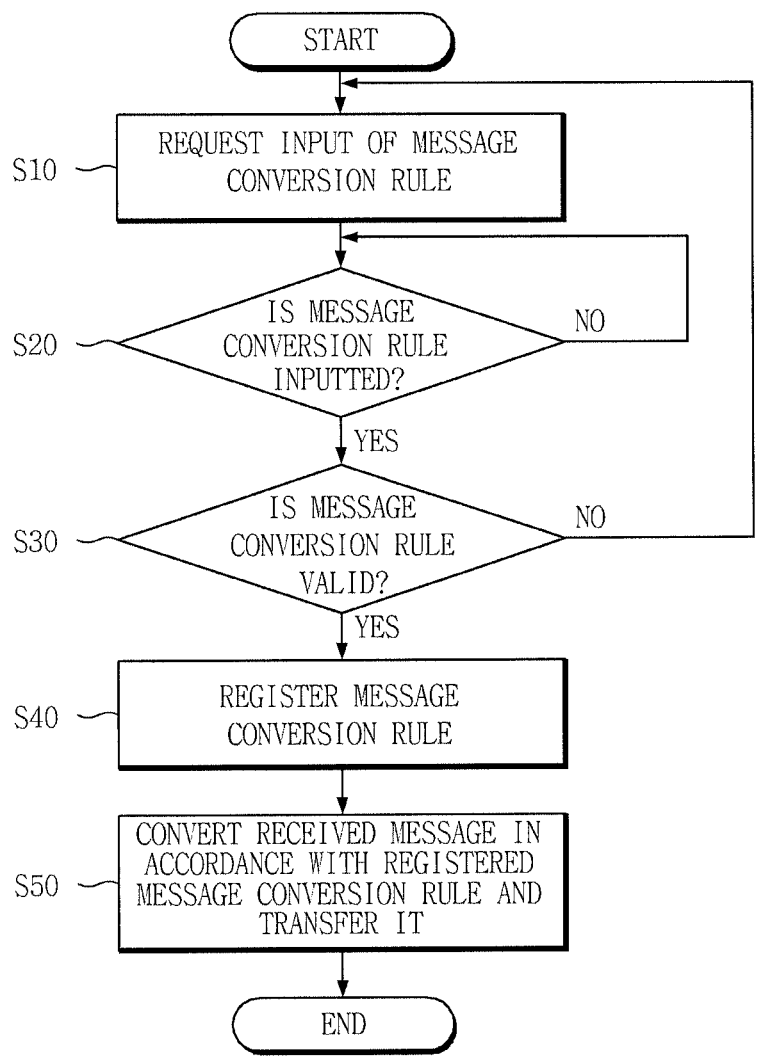
FIG. 7 is a flowchart showing a general middleware bridge method according to the present invention.

As such, the restoration information collector 120 manages the restoration information for restoration without the loss to restore information lost in conversion. FIG. 7 is a flowchart showing a general middleware bridge method according to the present invention.

Referring to FIG. 7, the general middleware bridge method according to the present invention will be described. The general middleware bridge method requests input of a conversion rule to a local middleware adaptor (S10) and judges whether or not the conversion rule has an error (S30) when the conversion rule is inputted (S20; Yes). When the inputted message conversion rule has the error (S30; No), the general middleware bridge method inputs the conversion rule again by notifying the occurrence of the error in the inputted message conversion rule. When a normal conversion rule is inputted at step S30 (S30; Yes), the general middleware bridge method registers a converted conversion rule document (S40). Thereafter, the general middleware bridge method repetitively performs conversion and output through registered conversion rule corresponding to the received messages (S50).

Hereinafter, the general middleware bridge method according to the present invention will be described in more detail. In the description, the general middleware bridge method will be described based on the IWF engine of the general middleware bridge. Moreover, although in the present invention, the general middleware bridge may be configured to include the IWF engine or the local middleware adaptor, but preferably includes the IWF engine as a basic configuration.

Figure 8:
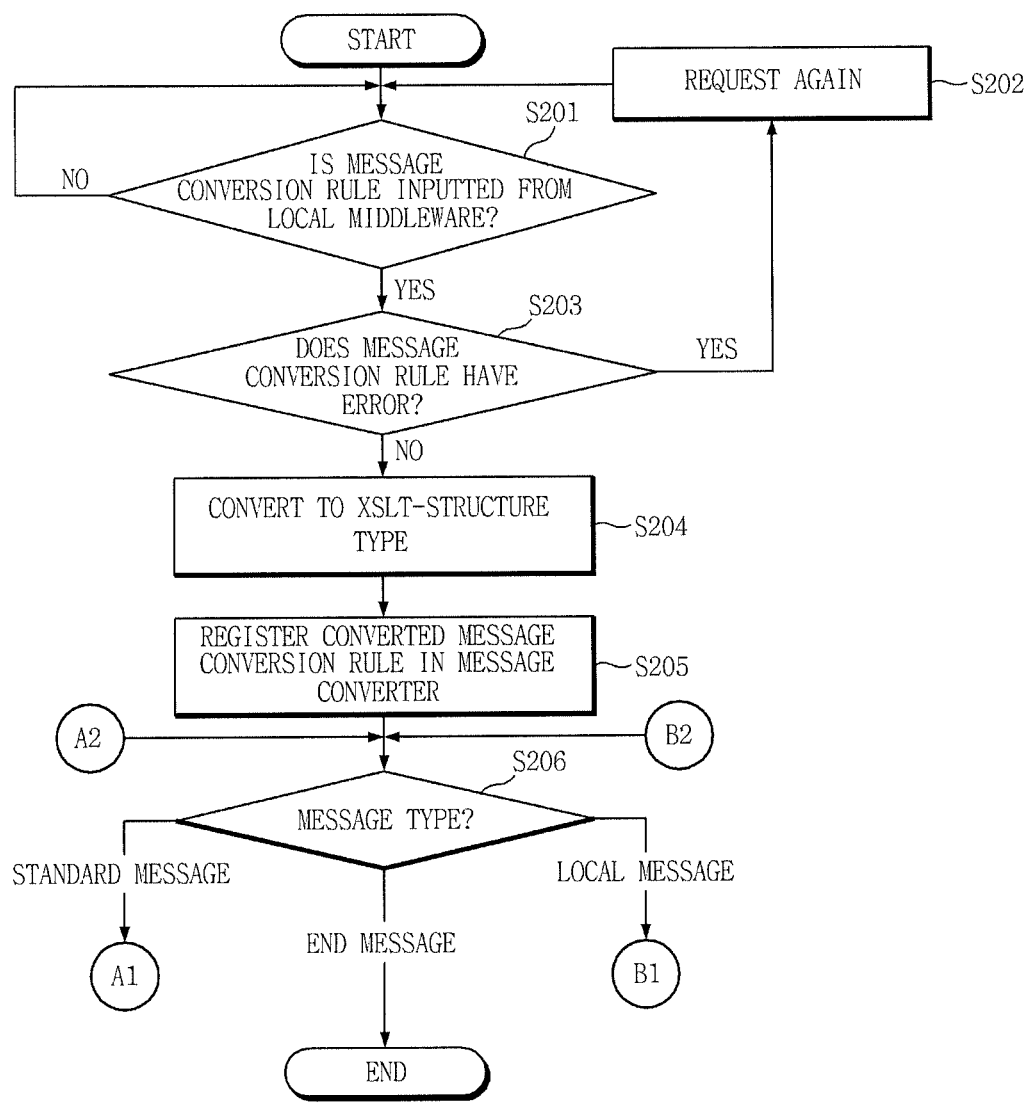
FIGS. 8 to 10 are diagrams showing one example of a message conversion process of an IWF engine according to the present invention.
Figure 9:
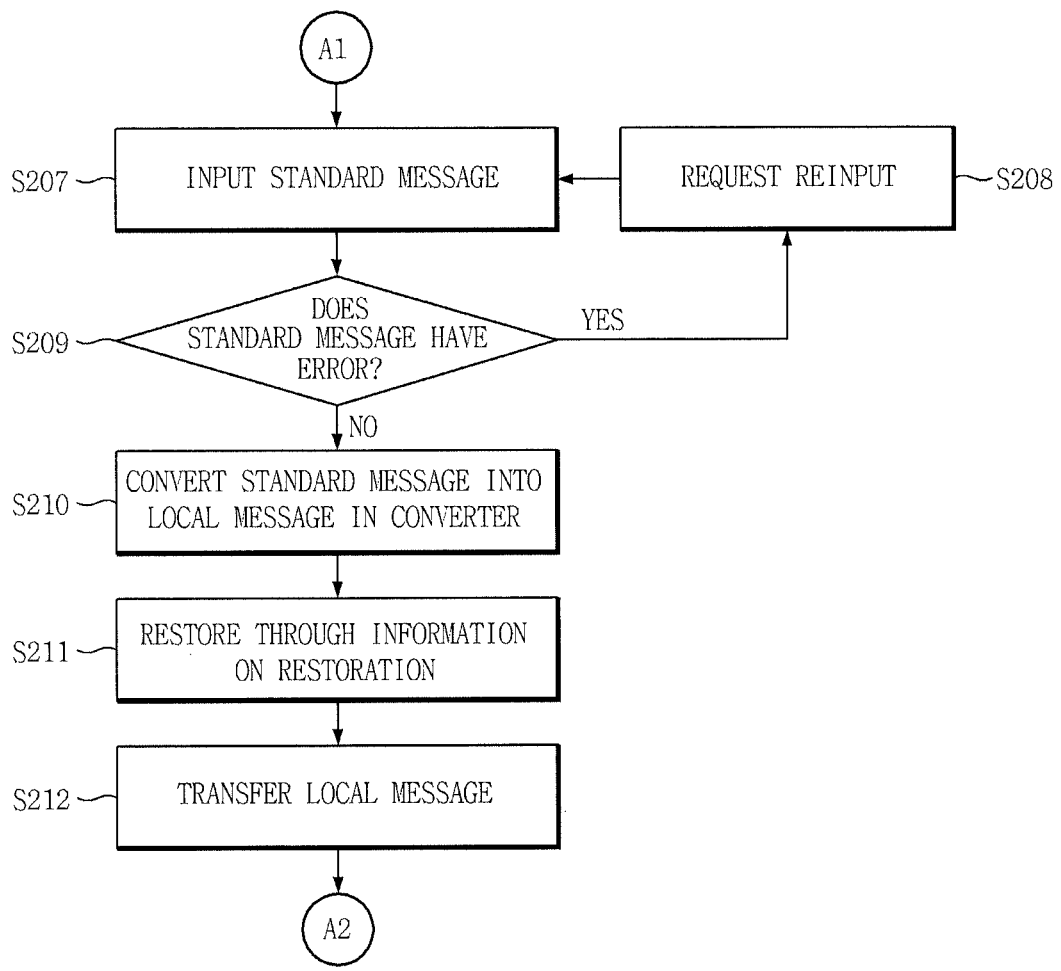
Figure 10:
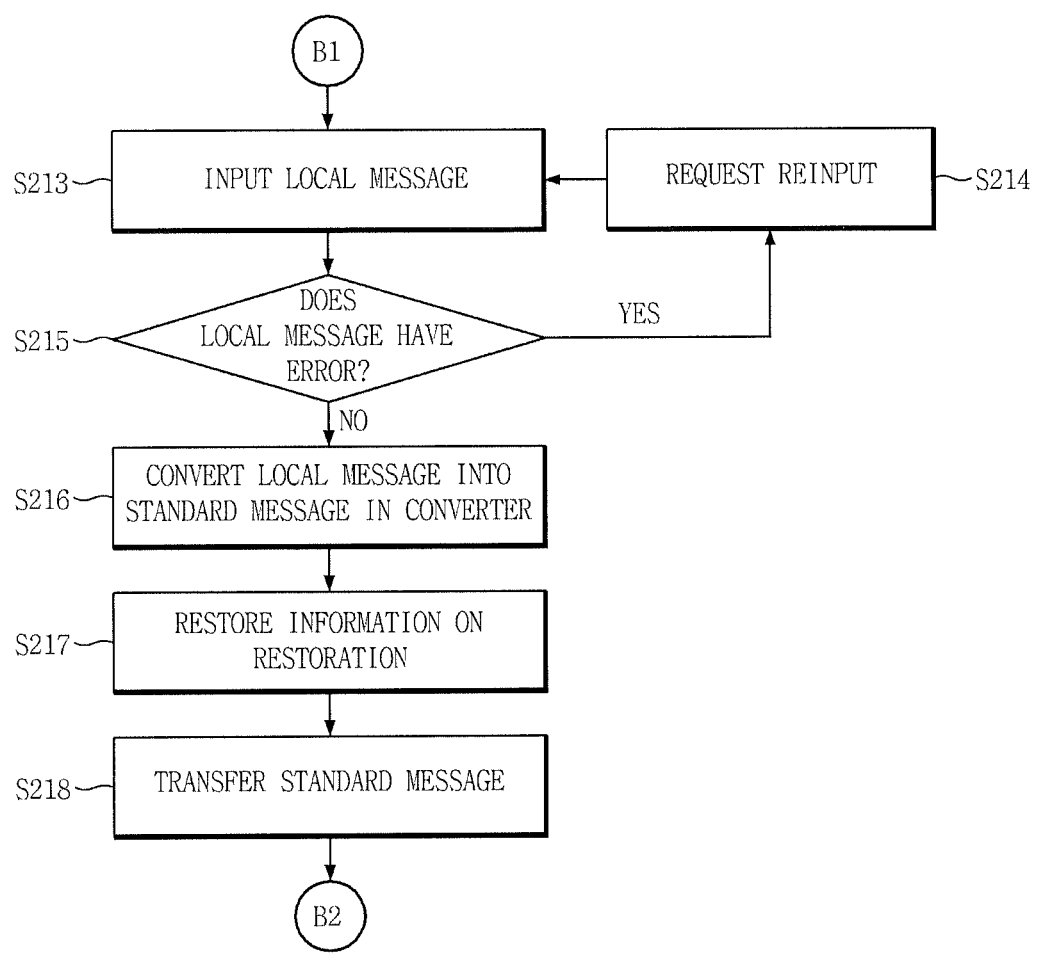

FIGS. 8 to 10 are diagrams showing one example of a message conversion process of an IWF engine according to the present invention.

Referring to FIG. 8, first, when a conversion rule collector 120 of an IWF engine receives a message conversion rule (S201), the conversion rule collector 120 judges whether or not the message conversion rule has an error (S203). When the inputted message conversion rule has the error, the conversion rule collector 120 notifies that fact that the conversion rule has the error to a local middleware adaptor 40 to receive another conversion rule again (S202). When a normal message conversion rule is inputted at step S203, a message converter 140 generates a conversion rule document by converting the message conversion rule (S204), in which the generated conversion rule document is registered in the message converter 140 (S205).

Thereafter, the message converter 140 receives a message and judges the type of the message (s206).

At step s206, when the message converter 140 receives a standard message, the message converter 140 converts the standard message.

Referring to FIG. 9, a transferring sequence of the standard message will now be described at step s206 (A1). The message converter 140 receives the standard message from a standard protocol channel 30 (S207). The message converter 140 judges whether or not the message has an error and thereafter, when the message has no error according to the judgment result (S209), a standard message—local message converter 141 of the message converter 140 converts the standard message into a local message (S210). When the corresponding message has the error at step S209 (S209), the message converter 140 notifies a fact that the inputted message has the error to the standard protocol channel 30 (S208).

Next, the message converter 140 restores the converted message by prestored restoration information in order to prevent the existing loss from being generated in the message after conversion (S211). The message converter 140 transfers the restored local message to a local middleware adaptor 40 (S212). Thereafter, the message converter 140 receives a subsequent message (A2).

Referring to FIG. 10, a transferring sequence of the local message will now be described when the local message is inputted at step S203 (B1). The message converter 140 receives a message transferred from a local middleware device 50 from the local middleware adaptor 40 (S213). The message converter 140 judges whether or not the message has an error and thereafter, when the message has no error according to the judgment result (S215), a local message—standard message converter 142 of the message converter 140 converts the local message into the standard message (S216). When the corresponding message has the error at step S215 (S215), the message converter 140 notifies a fact that the message inputted from the local middleware adaptor 40 has the error (S214).

At this time, a restoration information collector 130 registers information on restoration in order to prevent the converted message from being lost (S217). Thereafter, the message converter 140 transfers the converted standard message to the standard protocol channel 30 (S218). Thereafter, the message converter 140 receives a subsequent message (B2).

As such, while the message converter 140 repetitively performs the steps S203 to S218, the message converter 140 receives an end message and ends the message converting operation.

Figure 11:
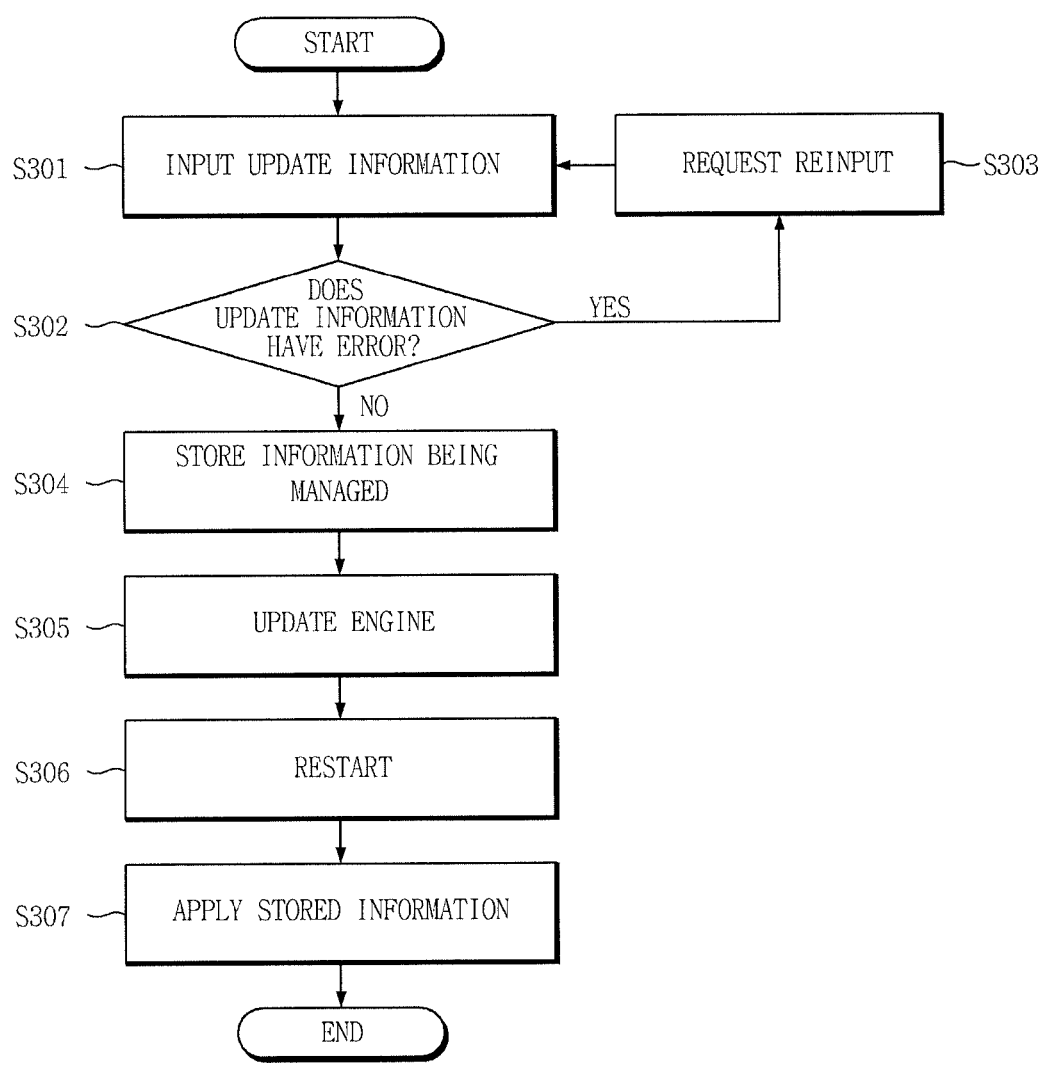
FIG. 11 is a flowchart showing an update operation of an IWF engine according to the present invention.

FIG. 11 is a flowchart showing an update operation of an IWF engine according to the present invention.

Referring to FIG. 11, the update sequence of the IWF engine according to the present invention will now be described. When update information is generated in the standard protocol channel 30, the IWF engine receives the updated information (S301).

The IWF engine judges whether or not the update information has an error and thereafter, when the update information has no error according to the judgment result (S302), the IWF engine performs engine update (S304). When the update has the error (S302) the IWF engine notifies that face that the update has the error to the standard protocol channel 30 and receives another update information again (S303). When the IWF engine receives normal update information, the IWF engine stores all information being managed for the engine update (S304) and performs the update (S305). When the update of the IWF engine is ended and the IWF engine is restarted (S306), the IWF engine reads the previously stored management information again to restore the information managed before the update so as to implement normal interworking (S307).

Figure 12:
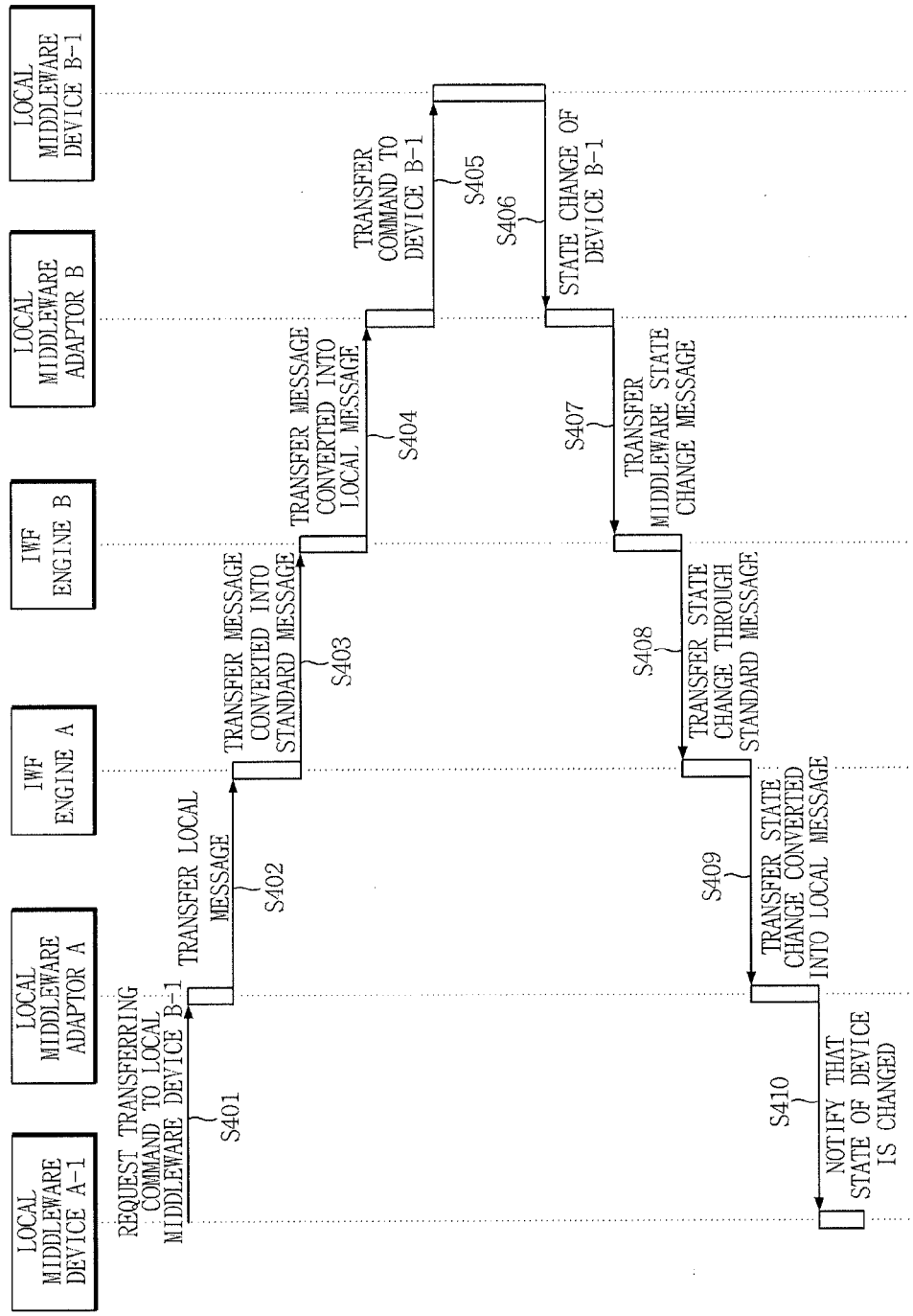
FIG. 12 is a diagram showing one example of a message transferring process according to the present invention.

FIG. 12 is a diagram showing one example of a message transferring process according to the present invention.

Referring to FIG. 12, the message transferring process of the general middleware bridge method will now be described.

First, a local message of a local middleware device A-1 reaches a local middleware adaptor A (S401). Herein, the local message is requested to be transferred to a local middleware device B-1.

Next, the local middleware adaptor A transfers the message to an IWF engine A (S402). The IWF engine A converts the transferred message into a standard protocol document through a conversion rule XSLT document generated in accordance with an already registered conversion rule. The IWF engine A transfers the standard protocol document to another IWF engine B (S403). The IWF engine B converts the transferred standard message into a local message for the local middleware device B-1 (S404). The adaptor B transfers the local message to the local middleware device B-1.

Subsequently, the local middleware adaptor B includes information on a state change performed in accordance with the received local message in the local message once again (S406) and transfers the local message to the IWF engine B (S407). The IWF engine B converts the transferred message into the standard protocol document through the conversion rule XSLT document generated in accordance with the already registered conversion rule. The IWF engine B transfers the standard protocol document to another IWF engine A (S408). The IWF engine A converts the transferred standard message into a local message for the middleware device A-1 (S409). The adaptor A transfers the local message to the local middleware device A-1 (S410). By the above-mentioned method, different middleware devices interwork with each other.

As described above, although a method of developing different middleware bridges and a middleware bridge according to the present invention have been described with reference to the illustrated drawings, the present invention is not limited to the embodiment disclosed in the specification and the drawings but can be applied within the scope where the spirit of the present invention is protected.

What is claimed is:

1. A general middleware bridge, comprising:
a hardware processor;
a conversion rule collector running on the processor and collecting message conversion rules for an interoperability operation between different middleware devices;
a conversion rule register registering the message conversion rules for each message type;
a message converter interconverting messages from the middleware devices on the basis of the message conversion rules and the message type and transferring the converted messages for each message type; and
a restoration information collector collecting restoration information for restoring messages in order to prevent data from being lost in message conversion of the message converter,
wherein the conversion rule collector verifies the validity of a newly inputted message conversion rule by judging whether the message conversion rule has an error when the message conversion rule is inputted,
wherein the conversion rule collector verifies the validity of a XML format,
wherein the conversion rule register registers the corresponding message conversion rule when the inputted message conversion rule is a normal conversion rule from the validity verification result, and the conversion rule collector requests the corresponding conversion rule again when the inputted message conversion rule is an abnormal conversion rule from the validity verification result,
wherein the message type includes a standard message transferred through a standard protocol channel and a local message transferred to each of the middleware devices,
wherein the message converter includes:
a standard message—local message converter converting the standard message into the local message by a first conversion rule; and
a local message—standard message converter converting all of the local message into the standard message by a second conversion rule,
wherein the restoration information collector stores information on restoration which are reference to information to be restored and information required to restore the message when a local middleware device registers the conversion rule,
wherein the information on restoration is stored in a memory when the local middleware device sends the information, an ID managed by the conversion rule collector is connected with an ID used by the local middleware device and the connected IDs are stored in the memory, and
wherein the restoration information collector stores the information on restoration when the local message is converted into the standard message, and restoration is performed by calling the information when the standard message is converted into the local message.

2. The general middleware bridge according to claim 1, wherein the conversion rule register updates only a conversion rule corresponding to the standard message when update is generated in the standard protocol channel.

3. The general middleware bridge according to claim 1, wherein the conversion rule collector provides a conversion rule schema of an XML-format for collecting the message conversion rules.

4. The general middleware bridge according to claim 1, further comprising a restoration information collector collecting restoration information for restoring messages in order to prevent data from being lost in message conversion of the message converter.

5. A general middleware bridge method, comprising:

collecting message conversion rules for an interoperability operation between different middleware devices;

registering the message conversion rules for each message type; and interconverting messages from the middleware devices on the basis of the message conversion rules and the message type and transferring the converted messages for each message type, collecting restoration information for message restoration in order to prevent data from being lost in message conversion, wherein the collecting the message conversion rules verifies the validity of a newly inputted message conversion rule by judging whether the message conversion rule has an error when the message conversion rule is inputted, wherein the collecting the message conversion rules verifies the validity of a XML format, wherein the registering the conversion rules registers the corresponding message conversion rule when the inputted message conversion rule is a normal conversion rule from the validity verification result, and the collecting the message conversion rules requests the corresponding conversion rule again when the inputted message conversion rule is an abnormal conversion rule from the validity verification result, wherein the message type includes a standard message transferred through a standard protocol channel and a local message transferred to each of the middleware devices, wherein the converting includes:

converting the standard message into the local message by a first conversion rule; and converting all of the local message into the standard message by a second conversion rule, wherein the collecting restoration information for message restoration stores information on restoration which are reference to information to be restored and information required to restore the message when a local middleware device registers the conversion rule, wherein the information on restoration is stored in a memory when the local middleware device sends the information, an ID managed by the conversion rule collector is connected with an ID used by the local middleware device and the connected IDs are stored in the memory, and wherein the collecting restoration information for message restoration stores the information on restoration when the local message is converted into the standard message, and restoration is performed by calling the information when the standard message is converted into the local message.

6. The general middleware bridge method according to claim 5, wherein the registering the message conversion rules for each message type updates only a conversion rule corresponding to the standard message when update is generated in the standard protocol channel.

7. The general middleware bridge method according to claim 5, wherein the collecting message conversion rules provides a conversion rule schema of an XML-format for collecting the message conversion rules.

8. The general middleware bridge method according to claim 5, further comprising collecting restoration information for message restoration in order to prevent data from being lost in message conversion.

* * * * *